Inventor
ABRAHAM A. GOLDBERG

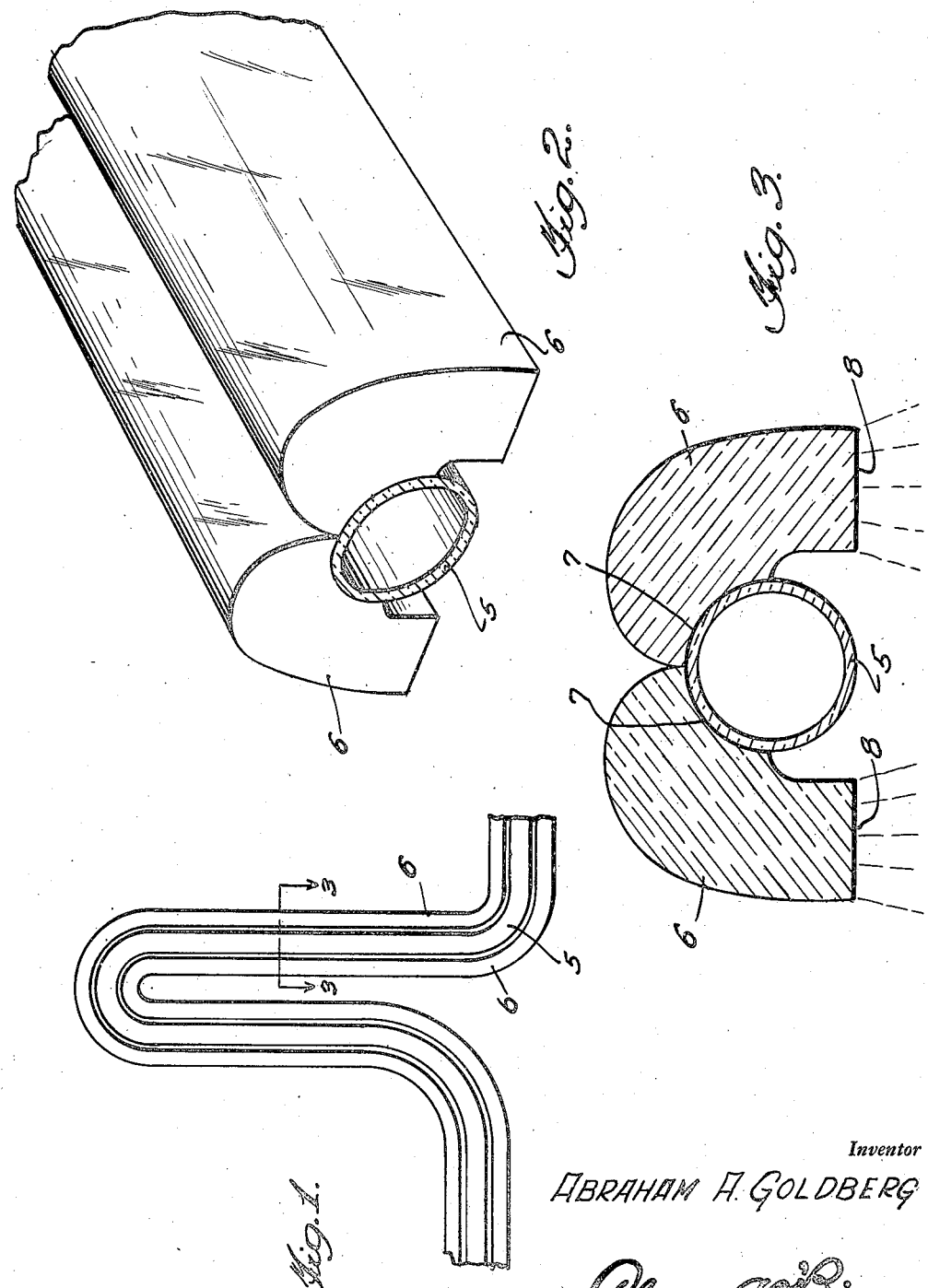

Patented July 23, 1946

2,404,627

UNITED STATES PATENT OFFICE 2,404,627

LIGHT AMPLIFYING ATTACHMENT FOR NEON TUBES

Abraham A. Goldberg, Miami, Fla.

Application October 29, 1943, Serial No. 508,227

1 Claim. (Cl. 240—1)

The present invention relates to new and useful improvements in illumination for signs and other purposes and more particularly to means for increasing the size of the beam or light projecting area of neon light tubes.

A further object is to provide means for accomplishing this purpose of simple and practical construction, which is efficient in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary front elevational view of a section of neon tube embodying my invention.

Figure 2 is a fragmentary perspective view thereof.

Figure 3 is a transverse sectional view.

Figure 4:
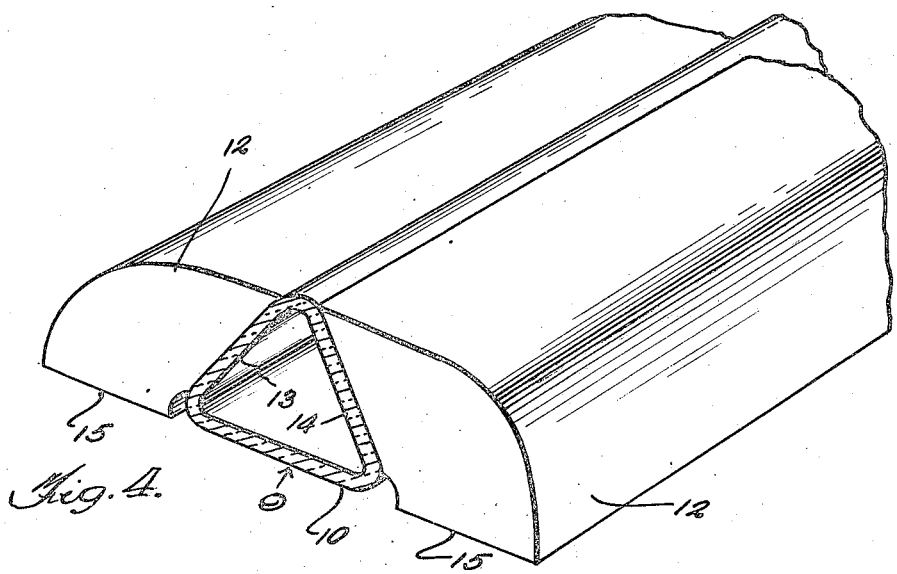
Figure 4 is a fragmentary perspective view of a modified tube construction.

Referring now to the drawings in detail and with particular reference to Figures 1 to 3, inclusive, the numeral 5 designates a conventional type of neon tube and 6—6 represents a pair of solid bars of light transmitting material such as "Lucite." Each bar has one longitudinal edge curved as at 7 to conform to the contour of the tube 5 and the curved edges of the pair of bars are placed against the rear and side of tube and combine to cover the rear half of the tube as shown in Figure 3. Extending from the curved edges 7, the bars are curved transversely in a forward direction with respect to the front of the tube and the front edges 8—8 of the bars terminate in a common plane on a line with the forwardmost portion of the tube.

Figure 5:
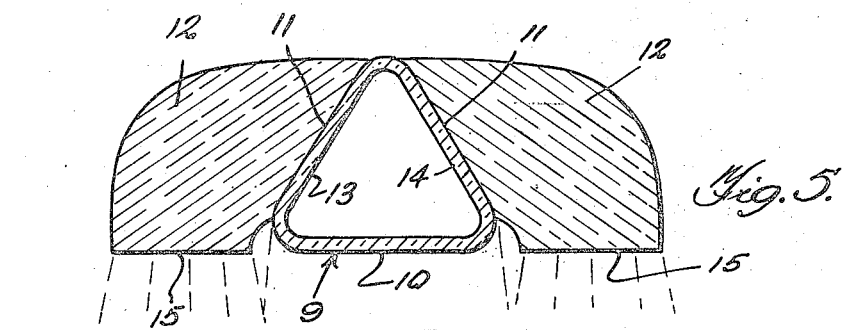
Figure 5 is a transverse sectional view thereof.
Figure 6:
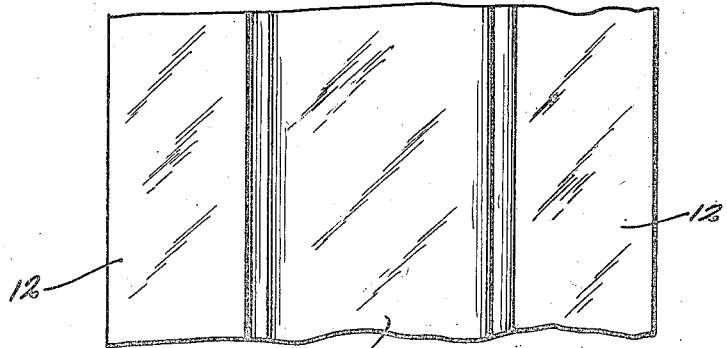
Figure 6 is a fragmentary front elevational view.

In Figures 4 to 6, inclusive, the invention is shown in use with a neon tube 9 of triangular shape in cross section and in which one surface 10 forms the front of the tube and the inner edges 11—11 of the light transmitting bars 12—12 are flattened and contact the surface of the two remaining sides 13 and 14 of the tube respectively. The rays of light from the sides 13 and 14 of the tube pass through the bars in the same manner as heretofore explained and are similarly projected from the front surface 15—15 of the bars.

The gist of the invention has to do with novel and improved light concentrating and focusing means in the form of an attachment which lends itself applicable to a standard neon tube, the attachment actually being made out of a pair of elongated lens-like duplicate bars and said bars being of solid transparent material and approximately J-shaped in cross sectional form. Accordingly, with the attachment means in place as shown in the drawings, the effective light area produced by the tube will be increased correspondingly to the provisions afforded by the combined thickness of the pair of bars.

It is believed that the details of construction and manner of use of the device will be readily understood from the foregoing without further detailed explanation.

Having described the invention, what is claimed as new is:

A light concentrating and focusing attachment for a standard neon tube comprising a pair of elongated lens-like duplicate bars, said bars being of solid transparent material and approximately J-shaped in cross-sectional form, the corresponding inner longitudinal edges being concaved to define channels for reception of regions of the tube collectively defining a half-portion of said tube, the major outer surfaces of said bars being of convex form and the outer longitudinal edges being flat, in a plane with one another and co-planar with the crest of the remaining half-portion of said tube.

ABRAHAM A. GOLDBERG.